Aug. 26, 1941. W. TIMSON 2,254,053
INDICATING MECHANISM
Filed Nov. 21, 1938 2 Sheets-Sheet 1

Inventor
William Timson.
Per: Marshall & Marshall
Attorneys

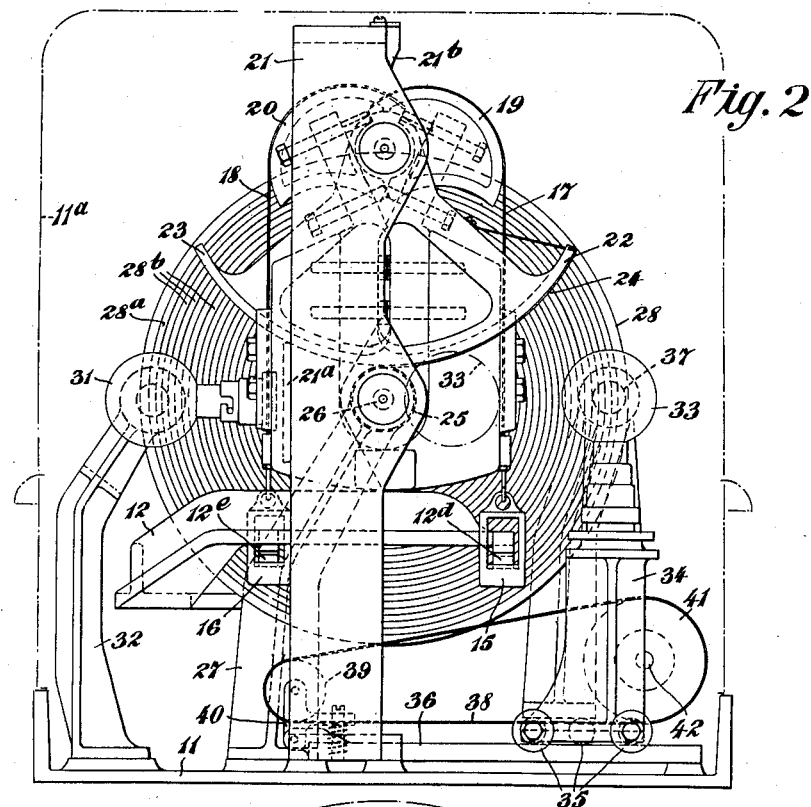

Patented Aug. 26, 1941

2,254,053

UNITED STATES PATENT OFFICE 2,254,053

INDICATING MECHANISM

William Timson, Birmingham, England, assignor to W. & T. Avery Limited, Birmingham, England Application November 21, 1938, Serial No. 241,582
In Great Britain December 4, 1937

2 Claims. (Cl. 88—24)

This invention has reference to improvements in indicating mechanism of the kind employing a light source to project the desired indication on to a screen, the indication embodying one or more variable factors relative to a basic factor as obtains, for example, where varying basic price units are co-related to weight units, and it is desired to obtain a price computation resulting from a product of the two factors.

The invention is not limited in its application to weighing apparatus, or even to price computing weighing apparatus, as it may be applied to measuring apparatus, or to other forms of apparatus in which the two factors hereinbefore referred to obtain.

The object of the present invention is to obtain a clear visual indication of the units at considerable magnification on a screen which indication shall be readily discernible by the operator or other party or parties, say for example, to a vendor and his customer.

The invention consists of an indicating mechanism incorporating a light projecting system which may be associated with weighing, measuring, or other apparatus embodying a basic unit (such as weight or volume) and a correlated variable unit (such as price values or computations), and is characterised by a stationary light projecting system, and a traversable or adjustable light projecting system, the two systems projecting the indicia associated therewith on to a screen whereby both projections are observable at the same time in juxta-position.

The invention will now be described in one of its applications, namely, to a weighing and price indicating and computing mechanism of the kind usually associated with shop or stores counter usage.

Such an adaptation is illustrated by the accompanying drawings, in which corresponding reference numerals indicate like parts in the several views.

Figure 2 is an end elevation taken on the line 2—2 of Figure 1, and

Figure 3 is a cross-sectional elevation of the indicative part of the mechanism viewed on a plane through line 3—3 of Figure 1.

Figure 1:
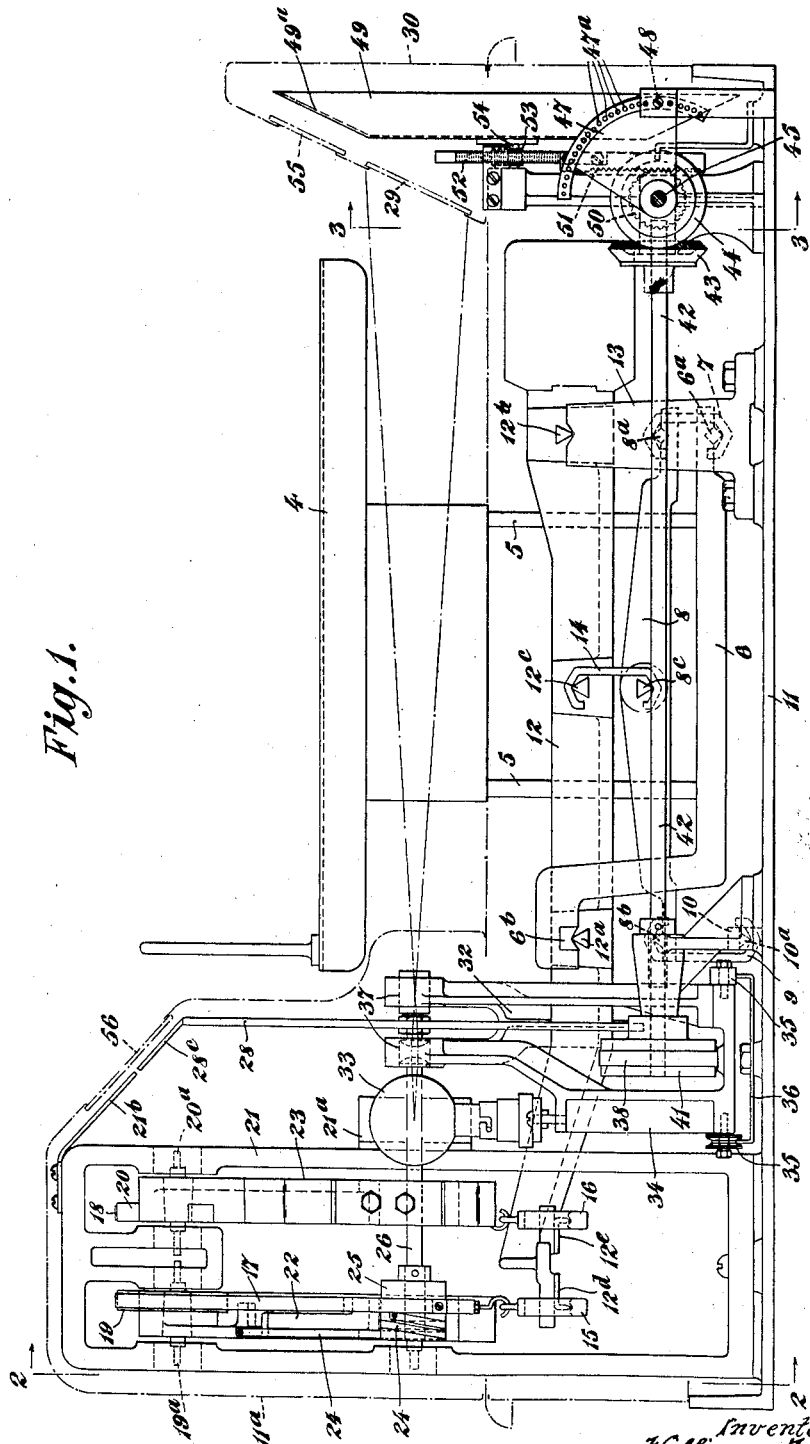
Figure 1 is a side elevation showing the essential parts of the mechanism.

The weighing mechanism may be of any convenient kind but in the illustrated embodiment has a scale plate 4 mounted by means of a plurality of uprights 5 on a lever 6, which at its one end is supported by means of the knife edge 6ª in a link 7 dependent from the knife-edge 8ª located at one end of the intermediate lever 8 which is fulcrumed by means of the knife-edge 8ᵇ in the link 9 anchored to the bracket 10 by means of the knife-edge 10ª the bracket being mounted on the base plate 11. The other end of the scale plate supporting lever 6 is mounted by means of a bearing 6ᵇ on a knife-edge 12ª mounted in the main lever 12, which is fulcrumed on the knife-edge 12ᵇ in the bracket 13 which is bolted to the base plate 11. The main lever is connected intermediate the knife-edges 12ª and 12ᵇ by means of another knife-edge 12ᶜ through a link 14 with the centrally disposed knife-edge 8ᶜ of the intermediate lever 8. The long arm of the main lever 12 is mounted adjacent its free end by means of knife-edged plates 12ᵈ and 12ᵉ in dependent stirrups 15 and 16 from flexible metallic ribbons 17 and 18 respectively, these ribbons being anchored at their other extremity to the faces of oppositely disposed segments 19 and 20 respectively, which segments are pivotally mounted on aligned spindles 19ª and 20ª in ball-bearing races mounted in the bracket 21 located at one end of the base plate 11 within the housing 11ª. The segments 19 and 20 form the upper part of pendulous cam segments 22 and 23 respectively. To the face of the segment 22 there is attached a flexible metallic ribbon 24 which is wound about a rotatable drum 25 mounted on the spindle 26 carried at each extremity in ball-bearing races, the one race being carried by the bracket 21 and the other race being provided in the bracket 27 which is also mounted on the base plate 11. This arrangement of pendulous resistant mechanism is known in the art and does not form per se a part of the present invention.

That part of the mechanism which forms the essential features of this invention will now be described. Mounted on the one extremity of the spindle 26 is a transparent disc 28 which is provided on one face adjacent its periphery with a ring of weight graduations or indicia 28ª. In addition there is provided on the same face of the disc 28 a plurality of inner concentric rings of price computation indicia 28ᵇ which extend to an area adjacent the axis of the disc 28 according to the range of price computations which may be required, the said price computations representing products of the basic price value in relation to a given weight.

The weight indicia appearing on the outer ring 28ª of the transparent disc 28 is projected on to a screen 29 located in a housing 30 at the other end of the apparatus, this screen being disposed at an inclination of say 25° to the vertical plane, as this has been found by experiment to produce the maximum efficiency or clearness of indication, and it has further been found by experiment that if this screen is of the type known in commerce as a "satinised" aluminium then the projected image is clearly discernible either in day-light or in artificial light, and in the same connection it has been found that the best results are obtained when the lining or graining of the finish on the surface of the screen is arranged in a uniform manner so as to afford a maximum clarity according to the direction from which the light source is projected on to the surface of the screen.

The fixed light source 31 which is arranged to project the weight indicia from the ring 28a is mounted on a subordinate bracket 21a which in turn is mounted on the main bracket 21 hereinbefore referred to. The focal axis of the light source 31 is disposed coincident with the annular centre-line of the ring 28a. The lenses associated with this light source are mounted on a bracket 32, which is mounted on the base 11, the lenses being of known kind disposed on either side of the disc 28, and projecting the image from the disc 28 directly on to the screen 29 in a plane below the scale plate 4 and to one side of the mounting thereof upon the lever system.

For the purpose of projecting the price computations from the plurality of concentric rings 28b, there is provided another light source 33, arranged in the same vertical and horizontal planes as that of the light source 31. These light sources take the form of electric filament lamps. The lamp 33 is mounted upon a traversable carriage 34 which in turn is mounted upon a plurality of flanged wheels or rollers 35 upon a track 36 secured to the base 11. This traversable carriage 34 is also provided with a screened lens system 37 similar to that associated with the light source 31, whereby a section of the ring of price computations 28b which is in register with the focal plane of the light source 33, is projected on to the face of the screen 29, this projection being a direct projection in a plane below that of the scale plate 4 on the opposite side of the mounting thereof to that of the plane of projection of the weight indicia.

The traverse of the carriage 34, together with the associated light source 33 and screened lens system 37, is effected by means of a continuous band 38 which passes at one end over an idle pulley 39 mounted on an adjustable bracket 40 which in turn is mounted on the surface of the track 36. This continuous band 38 also passes around a drum 41 which is rotated through a shaft 42 which extends toward the opposite end of the scale into the base of the housing 30. This shaft 42 carries near its one extremity a bevel pinion 43 which meshes with another bevel pinion 44 which is mounted upon a spindle 45 which carries an operating knob 46 disposed external to the housing 30. This knob is connected to the quadrant 47 which is provided adjacent its periphery with a plurality of notches or indents 47a into any one of which is adapted to engage a spring-pressed ball-nosed plunger 48, which engagement serves to definitely locate the rotatable knob 46 in any one of a plurality of settings. Each of these settings coincide with the basic price value of the commodity, these price values being marked upon a rotatable disc 49 mounted in the housing 30. This disc is operated upon the rotation of the knob 46 through the spindle 45, the spur pinion 50, the meshing rack 51, the associated rack 52, and a pinion 53 mounted on the spindle 54 which carries the disc 49. The indicative periphery of this disc 49 is inclined as seen at 49a (Figure 1) in parallel with the inclination of the screen 29, so as to afford a coincident reading between that of the weight indicia and the price computations.

It will be appreciated that each of the basic price values, the setting of which is determined by the position of the knob 46 is definitely correlated to one of the rings of price computations 28b upon the transparent disc 28.

It will also be appreciated that simultaneous with the setting of the basic price value discernible on the disc 49 by the rotation of the knob 46 that the drum 41 is likewise rotated through the shaft 42 which effects a traverse of the carriage 34 through the medium of the continuous band 38, and it will be appreciated that the continuous band 38 is at a point in its length anchored to the traversable carriage 34 so as to rigidly couple these parts together in their desired relationship.

It will further be appreciated that in the construction of the invention illustrated the basic price value is discernible through the window 55 which is arranged in the same plane as the screen 29 and that in consequence a readily observable indication is afforded both to the vendor and to the purchaser on either side of the apparatus of the plurality of indications as is clearly seen in Figure 3 of the drawings.

As a means of indicating when the parts of the mechanism are in the balanced or zero position, there is provided on the transparent disc 28 a pointer 28c adapted to register with a fixed pointer 21b mounted on the bracket 21. The coincidence of these pointers 28c and 21b is readily discernible through the window 56 in the housing 11a.

The weight and price indicia on the transparent disc is produced by a known photographic process with the respective units in close approximation one to the other, and the numerals or markings are of a very small size, and the projection and magnification of this indicia through the screened lens affords a defined and greatly magnified indication on the surface of the screen which is visible in day-light, or in artificial light, and it is found that even direct rays of relatively strong light on the surface of the screen do not materially reduce the clarity or definition of the indications.

It will be appreciated that this invention may with advantage be applied to other usages than that particularly hereinbefore described, in that instead of indicating variable price computations, the mechanism may be adapted to indicate other variable factors such as weight increment factors of the ordinary or minor range of the weighing capacity of the apparatus, as for example, to indicate the addition of major weights; or again, instead of the application of this invention to a weighing apparatus it will be appreciated that this form of variable indication relative to a basic unit may be applied to say liquid measuring apparatus.

Preferably the apparatus embodies switch mechanism whereby the light sources are illuminated only at desired periods, for instance when a weighing operation is being performed.

The form of projection embodied in this invention is a direct projection as distinct from the more common indirect projection through reflectors or prisms, and the projected indicia on the screen may be viewed over a relatively large range of position, or from a considerable angle, for example it is found that it is possible to obtain a clear view of the indicia through an arc of 160° from the front of the screen.

It is further to be appreciated that in the form of the invention illustrated, the projected indicia is obtained on a common screen as distinct from the better known form of indirect projection on to a plurality of screens, but it should be appreciated that in certain circumstances it may be necessary or desirable to embody means for indirect projection of the weight and price or other indicia on to a screen or screens not having the same relationship to the light source as that which is shown in the drawings, and that such change can be made without departing from the scope of the claims of the present invention.

The source of illumination can be that of current obtained from the ordinary electric mains or supplied by accumulators, and any known form of switch mechanism may be incorporated for making or breaking the circuit according to requirements, such circuit and switch mechanism forming in themselves no part of the present invention.

In this specification where reference is made to a fixed light source and a lens projecting system it is intended that the term "fixed" should be understood to be relative, in that it will be obvious that in certain circumstances more than one setting of this fixed light source and the associated lens system may obtain. As an example it may be presumed that the weighing apparatus is provided with means for indicating in two systems of weighment, say in the avoirdupois and metric systems, and in such circumstances it would be necessary to make an initial adjustment or setting of what is termed the fixed light source and associated lens system before the weighing operation was effected. The reference in this specification to a traversable light source means a traversable system having a ready and immediately associated mechanism which will admit of a traverse of the light source and the associated lens system over a given range of price computations or other (say product) units of the basic price or weight value.

What I claim is:

1. In an apparatus of the class described, in combination, weighing mechanism, a chart movable by said weighing mechanism, having a consecutive series of weight indicia and a plurality of consecutive series of computation indicia, said indicia being so arranged that the movement of said chart by the weighing mechanism brings the indicium denoting the weight to a given fixed point and brings all of the computation indicia corresponding to said weight to a given fixed line, a stationary light source and lens system in registry with said fixed point, for projecting a magnified image of the weight indicium appearing at said point, a traversable light source and lens system movable selectively into registry with each computation indicium corresponding to said weight indicium, for projecting a magnified image of said computation indicium adjacent to the first image, and a screen in alignment with said lens systems for receiving said magnified images in juxtaposition.

2. In an apparatus of the class described, in combination, a commodity receiver, weighing mechanism connected thereto, a transparent chart movable by said weighing mechanism, having a series of weight indicia and a plurality of series of corresponding value indicia denoting the value of material on the commodity receiver, each series of value indicia corresponding to a price, said indicia being so arranged that movement of said chart by the weighing mechanism brings the indicium denoting the weight to a given fixed point and brings the indicium denoting the value of such weight at each price to a given fixed line, a stationary light source and lens system in registry with said fixed point, for projecting a magnified image of the weight indicium appearing at said point, a traversable light source and lens system movable selectively into registry with each value indicium appearing at said fixed line, for projecting a magnified image of said value indicium adjacent to the first image, a screen in alignment with said lens systems, having a substantial backward inclination from the vertical, for receiving said magnified images in juxtaposition, an indicator associated with said screen, for providing a numerical indication of the selected price adjacent said magnified images, and driving means connected both to said indicator and to said traversable light source and lens system, for simultaneously moving said indicator to the selected price, and moving the traversable light source and lens system into registry with the value indicium corresponding to such selected price.

WILLIAM TIMSON.